United States Patent
Schneider et al.

(10) Patent No.: US 6,942,895 B2
(45) Date of Patent: Sep. 13, 2005

(54) METHOD FOR SEALING THE CUT EDGES OF WEB-SHAPED FILTER MATERIAL

(75) Inventors: Horst Schneider, Waiblingen (DE); Hans Waibel, Remseck/Aldingen (DE)

(73) Assignee: MAHLE Filtersysteme GmbH, Stuttgart (DE)

( * ) Notice: Subject to any disclaimer, the term of this patent is extended or adjusted under 35 U.S.C. 154(b) by 32 days.

(21) Appl. No.: 10/362,616

(22) PCT Filed: Jun. 5, 2002

(86) PCT No.: PCT/DE02/02032
§ 371 (c)(1), (2), (4) Date: Feb. 24, 2003

(87) PCT Pub. No.: WO03/002234
PCT Pub. Date: Jan. 9, 2003

(65) Prior Publication Data
US 2003/0228963 A1 Dec. 11, 2003

(30) Foreign Application Priority Data
Jun. 27, 2001 (DE) .......................... 101 30 919

(51) Int. Cl.$^7$ .............................. B05D 1/02; B05D 3/12
(52) U.S. Cl. ....................... 427/289; 427/293; 427/424; 427/369; 427/421.1; 427/427.3; 427/427.4; 427/427.6
(58) Field of Search ................................ 427/289, 293, 427/424, 369, 421.1, 427.3, 427.4, 427.6

(56) References Cited

U.S. PATENT DOCUMENTS

| 5,015,377 | A | * | 5/1991 | Silvera ..................... 210/323.2 |
| 5,934,043 | A | * | 8/1999 | Aindow et al. ............. 53/371.4 |
| 6,010,548 | A | * | 1/2000 | Burkhead et al. ............. 55/378 |
| 6,193,830 | B1 | * | 2/2001 | Unrath ....................... 156/226 |
| 6,379,438 | B1 | * | 4/2002 | Schneider et al. ............. 96/154 |

FOREIGN PATENT DOCUMENTS

| DE | 29 38 234 | 2/1989 |
| DE | 40 27 272 | 2/1992 |
| DE | 195 24 677 | 1/1996 |
| DE | 197 00 340 | 7/1998 |
| DE | 44 45 842 | 11/1998 |
| DE | 198 44 874 | 4/2000 |
| GB | 2 018 148 | 2/1979 |

* cited by examiner

Primary Examiner—Katherine Bareford
(74) Attorney, Agent, or Firm—Collard & Roe, P.C.

(57) ABSTRACT

A method for sealing the cut edges which result when filter material is cut from a zigzag-shaped starting material is provided. The filter material area situated within an outer casing is at least partly interspersed with fine particles which are present therein in an unbound state. A cutter blade separates the filter material, which during the cutting process rests against an anvil, by exerting pressure which acts approximately perpendicularly on the material to be separated. According to the method, the severance cut takes place in an area which shortly prior to carrying out the severance cut has been impregnated with a liquid which is solidifiable under pressure.

8 Claims, 1 Drawing Sheet

METHOD FOR SEALING THE CUT EDGES OF WEB-SHAPED FILTER MATERIAL

Applicants claim priority under 35 U.S.C. §119 of German Application No. 101 30 919.8, filed on Jun. 27, 2002. This application is a National Stage Application filed under 35 U.S.C. § 371 of PCT/DE02/02032, filed on Jun. 5, 2002. The international application under PCT article 21(2) was not published in English.

BACKGROUND OF THE INVENTION

The invention relates to a method for sealing the cut edges which result when filter material is cut from a zigzag-shaped starting material.

Up to now, cut edges of generic filter material have been sealed after completion of the cutting process, by sealing material applied to the cut edges (DE 198 44 874 A1).

It is the object of the invention to rationalise the generic method.

SUMMARY OF THE INVENTION

This object is met by a generic method in which the severance cut takes place in an area which shortly prior to carrying out the severance cut has been impregnated with a liquid which is solidifiable under pressure.

The invention is based on the general idea of impregnating both sides of that narrow part of the web material in which area the severance cut is to be made, using a liquid which when the severance cut is made automatically undergoes solidification which is adequate for sealing the edges resulting from said severance cut. In this way, an additional process step of sealing the cut edges after producing them will be avoided. Furthermore, the consumption of sealing material is extremely low. The method is particularly advantageous when cutting off filter material containing activated carbon.

BRIEF DESCRIPTION OF THE DRAWINGS

Advantageous versions are disclosed in the subordinate claims and are explained in more detail in connection with a preferred embodiment.

This embodiment is shown in the drawing as follows.

DETAILED DESCRIPTION OF THE INVENTION

Figure 1:
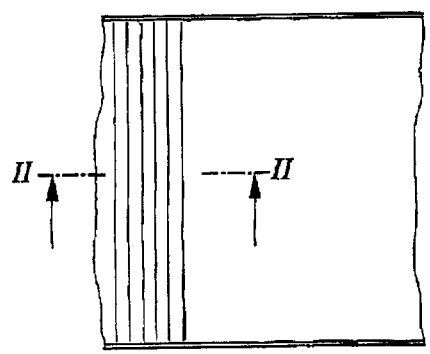
FIG. 1 is a top view of a filter web material that has been folded in a zigzag shape.
Figure 2:
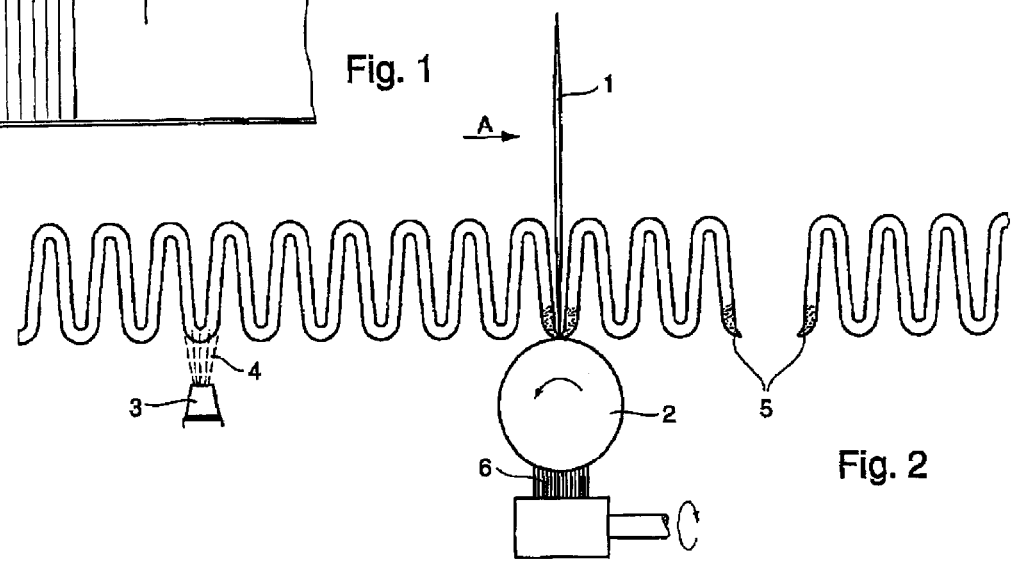
FIG. 2 is a section along line II—II of the filter web material according to FIG. 1, showing the cutting and sealing process.

The end region of an endless filter web material is folded in a zigzag shape. In this filter web area, filter web sections which can be processed to form filter elements are cut off.

Cutting off takes place in the bottom V-shape of a fold by means of a cutter blade 1 which rotates transversely to the filter web, with said cutter blade 1 working against an anvil in the form of a rotatable roller 2. The circumference of the roller 2 can be circular or polygonal in shape. In this process, the filter web material, which is situated between the cutter blade 1 and the roller 2, is separated as a result of the pressure of the cutter blade 1.

To repeat the above-mentioned cutting process, the filter web material is transported in the direction of arrow A. Prior to separation and in front of the line of separation, that area of the filter web material in which separation is to take place is impregnated with a sealing liquid 4 by means of a spray nozzle 3, wherein the liquid is sprayed into the filter material under pressure, so as to achieve complete impregnation. In the filter web material, between the outer mantle of the filter web material, there are fine particles such as for example activated carbon particles which are free in relation to the filter web base material. The liquid sprayed into the filter material is a latex dispersion of a composition which is known per se, said latex dispersion enabling adhesively acting solidification of the liquid, by exerting pressure on this liquid.

During separation of the filter web material between the cutter blade 1 and the roller 2, the pressure which the cutter blade 1 exerts on the filter web material causes the desired solidification of the impregnation liquid. In this way, adequate protection to the cut edges against any issuing of unbound particles present in the interior of the filter web material is automatically provided on completion of the cutting process.

The roller 2 is rotatably held. After each cutting process, its circumferential area is rotated such that for the next cutting process, the filter web material rests against a surface area of the roller 2, which surface area is adjacent to the area in which the preceding cutting process has taken place. This is so that, prior to its use for a new cutting process, the areas in which a cutting process has been completed on the roller 2 can be cleaned of any impregnation fluid which has been deposited on the roller surface during the cutting process. Cleaning can take place by means of a rotating brush 6.

The cutter blade 1 is a round disc which is rotatably held, said disc being held transversely to the filter web during the cutting process. The cleaning brush 6, too, can be moved transversely to the filter web during the cleaning process.

What is claimed is:

1. A method for sealing the cut edges which result when filter material is cut from web shaped starting material, in which method the filter material area situated within an outer casing is at least partly interspersed with fine particles which are present therein in an unbound state; and a cutter blade a cutting process whereby separates the filter material, which during the cutting process rests against an anvil, by exerting pressure which acts approximately perpendicularly on the material to be separated to perform a severance cut, wherein the severance cut takes place in an area which prior to carrying out the severance cut has been impregnated with a sealing liquid which is solidifiable under pressure; and solidifying said sealing liquid by the pressure exerted during the cutting and separating process.

2. The method according to claim 1, wherein the anvil is a circular cylindrical roller which after each severance cut is rotated by a partial circumferential area.

3. The method according to claim 2, wherein each severance cut which takes place on the anvil roller takes place on a partial circumferential section of the roller which has previously been cleaned.

4. The method according to claim 3, wherein cleaning of subsequent partial circumferential sections of the anvil-roller surface that occur as the anvil is rotated takes place in sections accordingly.

5. The method according to claim 4, wherein the partial circumferential sections of the anvil roller are cleaned by a rotating brush.

6. The method according to claim 1, wherein the sealing liquid with which the filter material is impregnated is a latex dispersion.

7. The method according to claim 1, wherein the sealing liquid is pressed into the filter web material under pressure.

8. The method according to claim 7, wherein the sealing liquid is sprayed in by means of a spray nozzle which is guided along the width of the web.

* * * * *